United States Patent [19]
Lange

[11] Patent Number: 6,055,598
[45] Date of Patent: Apr. 25, 2000

[54] ARRANGEMENT AND METHOD FOR ALLOWING SEQUENCE-INDEPENDENT COMMAND RESPONSES ACROSS A COMPUTER BUS BRIDGE

[75] Inventor: Ronald Edwin Lange, Glendale, Ariz.

[73] Assignee: VLSI Technology, Inc., San Jose, Calif.

[21] Appl. No.: 08/718,971

[22] Filed: Sep. 26, 1996

[51] Int. Cl.$^7$ .................................................. G06F 13/38
[52] U.S. Cl. ..................... 710/129; 710/100; 710/112; 711/145; 712/204; 714/50
[58] Field of Search .................................. 395/280, 309, 395/292, 325, 725; 364/900; 714/50; 710/100, 129, 112; 711/145; 712/204

[56] References Cited

U.S. PATENT DOCUMENTS

| | | | |
|---|---|---|---|
| 4,430,724 | 2/1984 | Hamilton et al. | 364/900 |
| 5,101,479 | 3/1992 | Baker et al. | 710/129 |
| 5,151,981 | 9/1992 | Westcott et al. | 714/50 |
| 5,535,340 | 7/1996 | Bell et al. | 395/292 |
| 5,632,021 | 5/1997 | Jennings et al. | 395/309 |
| 5,664,117 | 9/1997 | Shah et al. | 395/280 |
| 5,751,981 | 5/1998 | Witt et al. | 712/204 |
| 5,751,995 | 5/1998 | Sarangdhar | 711/145 |

OTHER PUBLICATIONS

"PCI Local Bus, PCI to PCI Bridge Architecture Specification", Apr. 5, 1994, pp. (i)–66.
"DECchip 21052 PCI–to–PCI Bridge Data Sheet", *Digital Equipment Corporation*, Order No.: EC–QHURA–TE, Jun. 1995, pp. (i)–A2.

*Primary Examiner*—Ayaz R. Sheikh
*Assistant Examiner*—Frantz Blanchard Jean

[57] ABSTRACT

An arrangement for providing command responses in a sequence that is independent of the sequence that commands are initiated by an initiating bus to a target bus. A first memory array stores commands from the initiating bus in a first sequence, and provides the commands to the target bus in a first sequence. Multiple delayed completion registers are provided, each to receive and store one of the commands entered into the first memory array. The delayed completion registers re-enter its corresponding stored command into the first memory array when a request is received to reissue the command. A second memory array stores command responses in a second sequence that relates to the order that their corresponding commands were successfully completed on the target bus.

50 Claims, 7 Drawing Sheets

| CODE | USE | ADDR/DATA | CMD/BE | |
|---|---|---|---|---|
| RESPONSE | | | | BE ENCODING |
| 0000 | NONE | — | — | BIT 3 DEVSEL |
| 0001 | BUFF1 RESPONSE | READ DATA | ENCODED | BIT 2 STEP + MST_ABT |
| 0010 | BUFF2 RESPONSE | READ DATA | ENCODED | BIT 1 TRDY + MST_ABT |
| 0011 | NONE | — | — | BIT 0 LAST CYCLE |
| BUFF1 | | | | |
| 0100 | NONE | — | — | |
| 0101 | NO BURST | DATA | BE | |
| 0110 | BURST | DATA | BE | |
| 0111 | ADDR CYCLE | ADDRESS | CMD | |
| BUFF2 | | | | |
| 1000 | NONE | — | — | |
| 1001 | NO BURST | DATA | BE | |
| 1010 | BURST | DATA | BE | |
| 1011 | ADDR CYCLE | ADDRESS | CMD | |
| POSTED WRITES | | | | |
| 1100 | NONE | — | — | |
| 1101 | NO BURST | DATA | BE | |
| 1110 | BURST | DATA | BE | |
| 1111 | ADDR CYCLE | ADDRESS | CMD | |

500  502

ARRANGEMENT AND METHOD FOR ALLOWING SEQUENCE-INDEPENDENT COMMAND RESPONSES ACROSS A COMPUTER BUS BRIDGE

FIELD OF THE INVENTION

The present invention relates generally to computer bus-to-bus bridging architectures. More particularly, the invention relates to a system and method for allowing command cycles to be completed across a bus bridge in a sequence different than the command initiation sequence.

BACKGROUND OF THE INVENTION

The wide use of computer technology over the past few decades has led to a variety of architectures for transferring information between a computer system's central processing unit (CPU) and its input/output (I/O) components, such as floppy and hard disk drives, monitors, user-input devices, and other peripheral devices in a computing system. One more recently-developed architecture uses a bus interface known as a peripheral component interface (PCI) bus interface. The structure of a computer system utilizing PCI buses and PCI bus interfacing technologies is illustrated in the context of FIG. 1.

Figure 1:
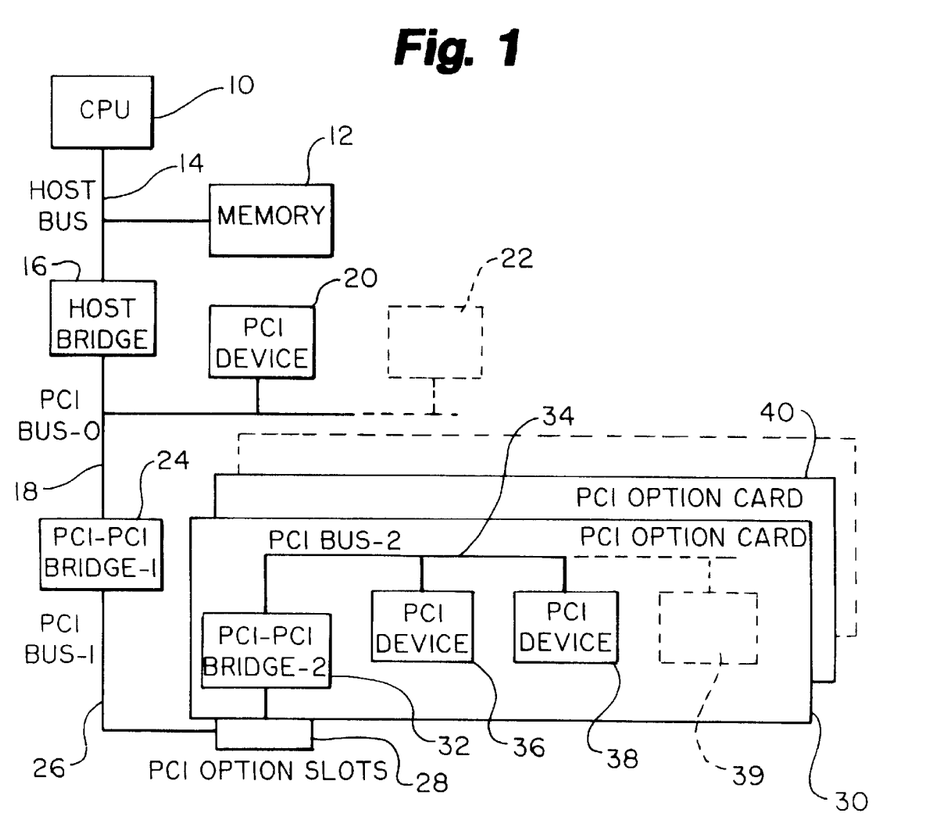
FIG. 1 illustrates a conventional architecture for transferring information between a central processing unit (CPU) and peripheral components.

In the system of FIG. 1, a personal computing system, or personal computer (PC), having a CPU 10 such as an 80486 or Pentium-type microprocessor device, is connected to memory 12, such as a random access memory (RAM), via a host bus 14. A host bridge 16 connects the host bus to a PCI bus, labeled PCI bus-0 18. PCI bus-0 18 is connected to a first PCI device 20, and is optionally coupled to other PCI devices represented by dashed block 22. PCI bus-0 18 is connected, via PCI bridge-1 24, to PCI bus-1 26. PCI bus-1 26 may be connected to PCI option slots 28 into which a first PCI option card 30 is inserted. PCI option card 30 contains a second PCI to PCI bridge 32 which allows interaction between PCI bus-1 26 and PCI bus-2 34. PCI bus-2 34 supports other PCI devices 36, 38, as well as additional PCI devices represented by dashed block 39. Additional PCI option cards 40 may also be inserted in the PCI option slots 28 for connecting additional PCI devices to the CPU 10.

The host bus 14, which couples the CPU 10 to the memory 12, operates at relatively high clock speeds, which provides for a relatively high information transfer rate between the CPU 10 and the memory 12. The host bridge 16, connecting other devices to the CPU 10, operates at relatively lower speeds. The PCI to PCI bridge-1 24 permits the optional extension of the PCI network, so that additional PCI devices can be connected to the CPU 10. The PCI to PCI bridge-1 24 is required to transfer data according to PCI standards, including 32 or 64 bit data words at 33 MHz or 66 MHz clock rates respectively. To maintain high data throughput, it is important that the PCI to PCI bridge-1 24 device minimizes delays caused by the accumulation of queued commands. The ability to provide a variable sequence of command responses, with respect to the original command order, is therefore desirable.

As described in the PCI to PCI Bridge Architecture Specification, Revision 1.0, Apr. 5, 1994, prepared by the PCI Special Interest Group, a PCI to PCI bridge must ordinarily maintain the coherency and the consistency of data that traverse the bridge. This includes data moving in either direction. Ordering rules exist for transactions that cross a PCI to PCI bridge.

Ordering generally refers to the relationship between a sequence of events on a particular bus. This sequence is independent of the transaction type, i.e., whether the transaction is a read or write. Since a bus bridge deals with two streams of events, it maintains ordering of both streams. This implies that when the bridge transfers events from one bus to the other, the relationship that existed on the initiating bus is maintained on the target bus. Ordering relationships are ordinarily established when an access completes on a bus, rather than when it is initiated. Therefore, an access that is terminated without transferring data has not occurred on the bus, and has no relationship with any other access. Accesses on different busses only have an ordering relationship established when a read traverses the bridge. Write transactions are ordered only with respect to other transactions on the same bus.

A prior art ordering sequence is described and illustrated in the PCI to PCI Bridge Architecture Specification prepared by the PCI Special Interest Group. There are two access sequences between a primary bus and a secondary bus across a PCI to PCI bridge. One access sequence is on the primary bus and one is on the secondary bus. For example, the primary bus access sequence may be a, b, c, d, e, f, g, h, i, and the secondary bus sequence may be 1, 2, 3, 4, 5, 6, 7, 8, 9. When the PCI to PCI bridge has been programmed to forward accesses from one bus to the other, the ordering of those accesses is maintained. In one example, the PCI to PCI bridge may forward accesses b, d, f, and h from the primary bus to the secondary bus, and the bridge forwards accesses, 1, 2, 5, 7, and 9 from the secondary bus to the primary bus. The resulting sequence on the primary bus would be a, b, 1, 2, c, d, e, f, 5, 7, g, h, i, j, 9, while the resulting sequence on the secondary bus would be b, 1, 2, 3, 4, d, f, 5, 6, 7, h, 8, 9. The access order does not change, regardless of which bus the access originates or is completed on.

"Posted" memory accesses may be allowed to move ahead of a previously initiated "non-posted" access. Write data is "posted" when the data is configured to be accepted immediately by the target device, and the target has accepted responsibility for the command. The target takes responsibility to complete the operation by accepting the posted write command, and responds to the initiator that the command will be completed at the target. The cycle is complete on the initiating side when the target responds that it will accept responsibility for the command. Analogously, a "non-posted" memory transaction is one where the action must be completed on the target side before the target will return a response indicating a completed command cycle. The initiator passes the data through the bridge, and initiates a command cycle on the target on the other side of the bridge. The target then completes the action directed by the command, and sends a response to the initiator. The initiator never relinquishes its responsibility for completing the cycle as in the posted memory transaction. Read commands are non-posted memory transactions, because they require the return of data to complete the cycle. An access order change may occur when an access that is "posted" by the bridge is allowed to pass a "non-posted" access.

Despite the ability of posted commands to pass non-posted commands, the response order of non-posted commands follows the order of the commands as issued. This includes the order of those commands which must be "retried", which occurs when the command is not successfully completed at the target bus. Data throughput is adversely affected by this sequencedependence, and it is therefore desirable to minimize the delays caused by the accumulation of queued, sequence-dependent commands.

Accordingly, there is a need for an arrangement for allowing sequence-independent command responses across a PCI bridge. The present invention is directed to a system and method for providing a variable sequence of command responses, thereby minimizing the accumulation of commands, by allowing command responses to occur in the order that they are completed, rather than in the order they are initiated. The present invention provides an arrangement which overcomes the aforementioned drawbacks, and offers other advantages over the prior art.

SUMMARY OF THE INVENTION

The present invention is directed to a system and method for allowing command cycles to be completed across a bus bridge in a sequence different than the sequence in which the commands were initiated, thereby increasing overall data throughput.

In accordance with one embodiment of the invention, the present invention provides a bus interface bridge for providing command responses in a sequence independent of the sequence that commands are transferred from an initiating bus to a target bus. A first memory array stores commands from the initiating bus in a first sequence, and provides the commands to the target bus in the same sequence. Multiple delayed completion registers are provided, and each receives and stores one of the commands entered into the first memory array. The delayed completion registers will re-enter their stored commands into the first memory array when a request is received to reissue the command. A second memory array stores command responses in a second sequence that relates to the order that their corresponding commands were successfully completed on the target bus.

In another specific embodiment, the bus interface bridge includes a decode circuit to receive the command responses from the second memory array. The decode circuit includes a comparing circuit to compare a control code in the command response to a predetermined value representative of one of the delayed completion registers. The command corresponding to the command response is cleared from the matching delayed completion register, and from the second memory array.

In accordance with yet another embodiment, the present invention provides a method for providing command responses in a sequence which is independent of the sequence that commands are transferred from the initiating bus to the target bus. All of the commands are stored into a first memory queue in a first sequence, and each of the commands are also individually stored into different delayed completion registers. The commands from the first memory queue are executed at the target bus according to the first sequence. A retry response is initiated for those commands that are not successfully completed, and in response to receiving a retry response, the delayed completion registers storing the unsuccessfully completed commands reload their stored commands back into the first memory queue. Command responses are stored in a second memory queue in a second sequence corresponding to the order in which the commands from the first memory queue are successfully completed.

The above summary of the present invention is not intended to describe each illustrated embodiment or implementation of the present invention. This is the purpose of the figures and the associated discussion which follows.

BRIEF DESCRIPTION OF THE DRAWINGS

Other aspects and advantages of the present invention will become apparent upon reading the following detailed description and upon reference to the drawings in which.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE ILLUSTRATED EMBODIMENTS

The present invention is particularly advantageous in computing applications requiring high-speed communication between independent buses in computing systems. High-speed interfaces across peripheral component interconnect (PCI) buses, such as shown in FIG. 1, are particularly advantageous, where the local PCI buses couple the processing units and memories of interfacing computing systems. As processing speeds and memory transfer rates increase, it is desirable to incorporate high-speed PCI to PCI bridge devices, to take advantage of the increased processing and memory speeds. While the present invention may be applicable to many various digital communication environments, an appreciation of the invention is best obtained in the context of FIG. 2, in which a PCI to PCI bridge device is shown according to the present invention.

Figure 2:
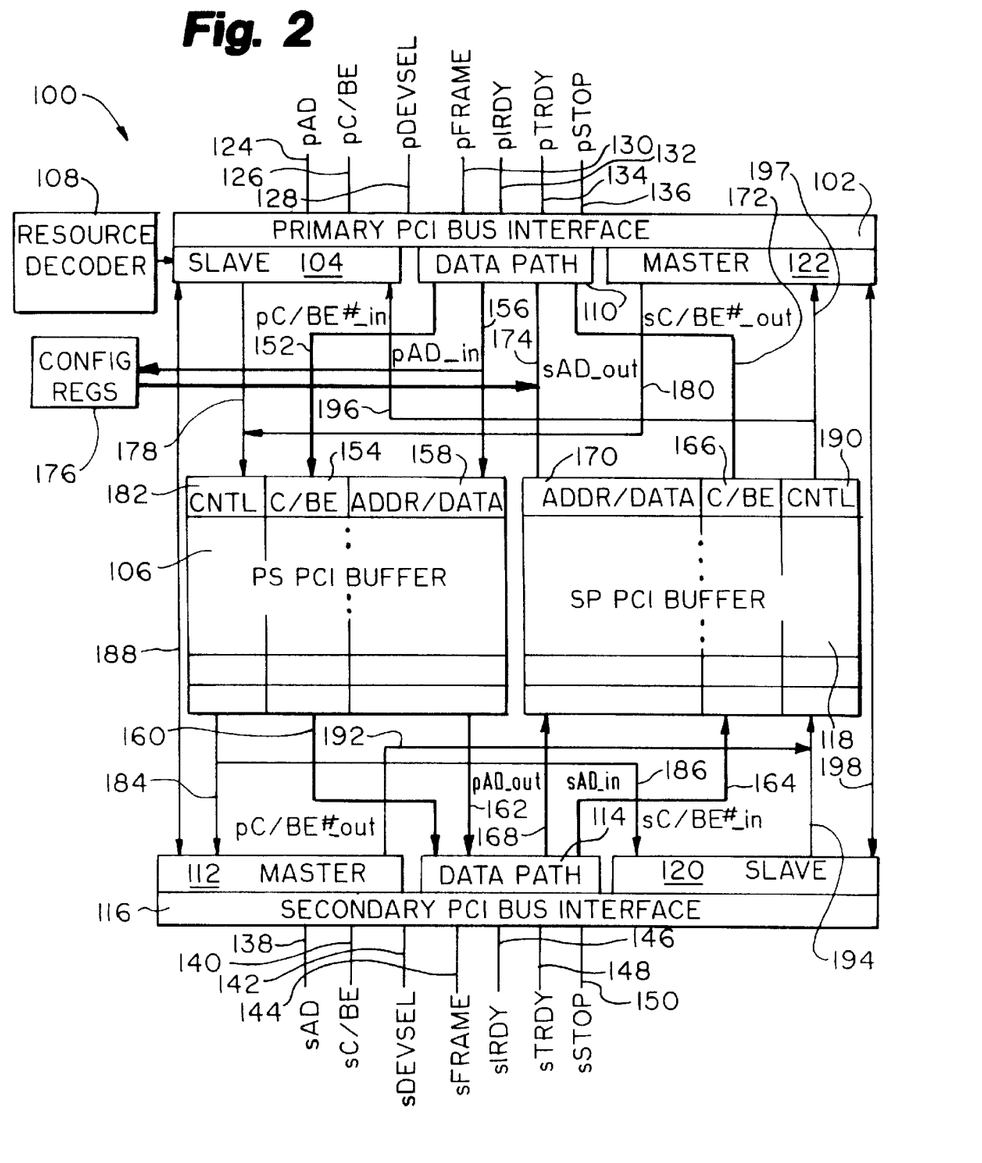
FIG. 2 illustrates an architecture of a PCI to PCI bridge device in accordance with the present invention.

FIG. 2 provides an illustration of the general architecture of a PCI to PCI bridge device 100. A description of the bridge architecture is provided to give an example of the type of bus bridge in which the present invention is implemented. The PCI bridge device 100 includes a primary PCI bus interface 102 which is the interface between the device and the primary PCI bus. The primary PCI bus interface 102 transmits and receives several input and output signals to the primary PCI bus during the data transfer process. According to PCI standards, the primary PCI bus interface 102 has an associated primary PCI slave 104. The primary PCI slave 104 is responsible for forwarding cycles from the primary bus to the primary-to-secondary (PS) PCI buffer 106, and responds to address decode hits from the resource decoder 108. The primary data path (DP) block 110 transfers command code, byte enable, address, and data information from the primary PCI bus to the PS PCI buffer 106. The primary configuration register 112 receives input from the primary DP block 110. In addition to receiving data from the primary DP block 110, the PS PCI buffer 106 receives control information from the primary PCI slave 104. The control information from the primary PCI slave 104 is transferred to the secondary PCI master 112, and the command code, byte enable, address, and data information in the PS PCI buffer 106 is transferred to a secondary DP block 114. The secondary PCI master 112 and the secondary DP block 114 are both associated with the secondary PCI bus interface 116. The secondary PCI master 112 is responsible for forwarding cycles received on the PS PCI buffer 106 to the secondary bus interface 116.

Since the PCI to PCI bridge device 100 is designed for data transfer in both directions, the architecture is symmetrical. Therefore, the secondary DP block 114 transfers command code, byte enable, address, and data information to the secondary-to-primary (SP) PCI buffer 118, which transfers the information to the primary DP block 110. The secondary PCI bus interface 116 is also associated with a secondary PCI slave 120 which, according to PCI protocol, handles the transfer of data from the secondary side to the primary side. Control information is transferred by the secondary PCI slave 120, to the SP PCI buffer 118, and is thereafter transferred to the primary PCI master 122.

The input and output signals from the primary PCI bus to the primary PCI bus interface 102 include the primary (p) address/data (AD) signal pAD on line 124, which is the address and data information to be transferred. The pC/BE signal on line 126 represents the primary command code (C) and byte enable (BE) data to be transferred across the bridge, and the PDEVSEL signal on line 128 is the signal which represents the PCI device selection. The pFRAME signal on line 130 initiates a data transfer, the pIRDY signal on line 132 is an interrupt ready signal indicating that a command transfer is ready, and the pTRDY signal on line 134 is a transfer ready signal indicating that data is ready to be transferred. The pSTOP signal on line 136 is a stop signal to terminate the data transfer process.

The secondary side of the PCI bridge device 100 has analogous inputs and outputs coupled to the secondary PCI bus interface 116. These signals include the secondary (s) address/data (AD) signals sAD on line 138, which is the address and data information to be transferred. The sC/BE signal on line 140 represents the primary command code (C) and byte enable (BE) data to be transferred across the bridge, and the sDEVSEL signal on line 142 is the signal which represents the PCI device selection. The sFRAME signal on line 144 initiates a data transfer, the sIRDY signal on line 146 is an interrupt ready signal indicating that a command transfer is ready, and the sTRDY signal on line 148 is a transfer ready signal indicating that data is ready to be transferred. The sSTOP signal on line 150 is a stop signal to terminate the data transfer process.

Information flows along at least three paths discussed below. The first path includes the flow from the primary PCI bus interface 102 to the secondary PCI bus interface 116, where the command code and byte enable data, labeled pC/BE#__in on line 152, are transferred from the data path block 110 of the primary PCI bus interface 102 to the C/BE segment 154 of the PS PCI buffer 106. Address and data information, labeled pAD__in on line 156, is passed to the address/data segment 158 of the PS PCI buffer 106. Command code/byte enable is transferred out of the PS PCI buffer 106 as the pC/BE#__out signals on line 160, and the address/data information is transferred out of the PS PCI buffer 106 as the pAD__out signal on line 162. Both the pC/BE#__out and the pAD__out signals on lines 160 and 162 respectively are sent to the data path block 114 of the secondary PCI bus interface 116.

An analogous second path also exists, where command code, byte enable, address, and data information are transferred from the secondary PCI bus interface 116 through the SP PCI buffer 118 to the primary PCI bus interface 102. Command code and byte enable information, labeled sC/BE#__in on line 164, is transferred from the data path block 114 at the secondary PCI bus interface 116 to the C/BE segment 166 of the SP PCI buffer 118. Address and data information, labeled sAD__in on line 168, is transferred from the data path block 114 of the secondary PCI bus interface 116 to the address/data segment 170 of the SP PCI buffer 118. The command code and byte enable information is transferred out of the SP PCI buffer 118 as the sC/BE#__out signal on line 172, and the address and data information is transferred out of the address/data segment 170 of the SP PCI buffer 118 as the sAD__out signal on line 174. Both the sC/BE#__out and the sAD__out signals on lines 172 and 174 respectively are sent to the data path block 110 of the primary PCI bus interface 102.

A third information path is shown providing signals between data path block 110 signals and the configuration registers 176. The pAD__in signal on line 156 is an input to the configuration registers 176, and the configuration registers 176 return data on line 174 to the primary data path block 110. The PCI bridge device 100 is configured by means of registers in the PCI configuration space. The configuration space in the example of FIG. 2 has 256 bytes organized as 64 double-words. This PCI configuration space includes two fields. The first field is composed of the required PCI header which occupies the first 64 bytes of the configuration space. This field consists of registers that uniquely identify the device, and allow the device to be controlled generally. The second field consists of device-specific information and/or control.

In addition to the three data path flows, there are other control paths for controlling the PCI bridge device 100. Control codes are transferred to the PS PCI buffer 106 from the primary PCI slave 104 on line 178, and from the primary master 122 on line 180. These control codes are stored in the type segment 182 of the PS PCI buffer 106 from where it is transferred to both the secondary PCI master 112 and the secondary PCI slave 120 along paths 184 and 186 respectively. Additionally, the primary PCI slave 104 can communicate directly with the secondary PCI master 112 through path 188.

Analogously, the secondary PCI master 112 and the secondary PCI slave 120 transfer control codes to the type segment 190 in the SP PCI buffer 118 on lines 192 and 194 respectively. The control codes are transferred out of the type segment 190 in the SP PCI buffer 118 to the primary PCI slave 104 and the primary PCI master 122 along paths 196 and 197 respectively. In addition, the primary PCI master 122 can communicate directly with the secondary PCI slave 120 via path 198.

Figure 3:
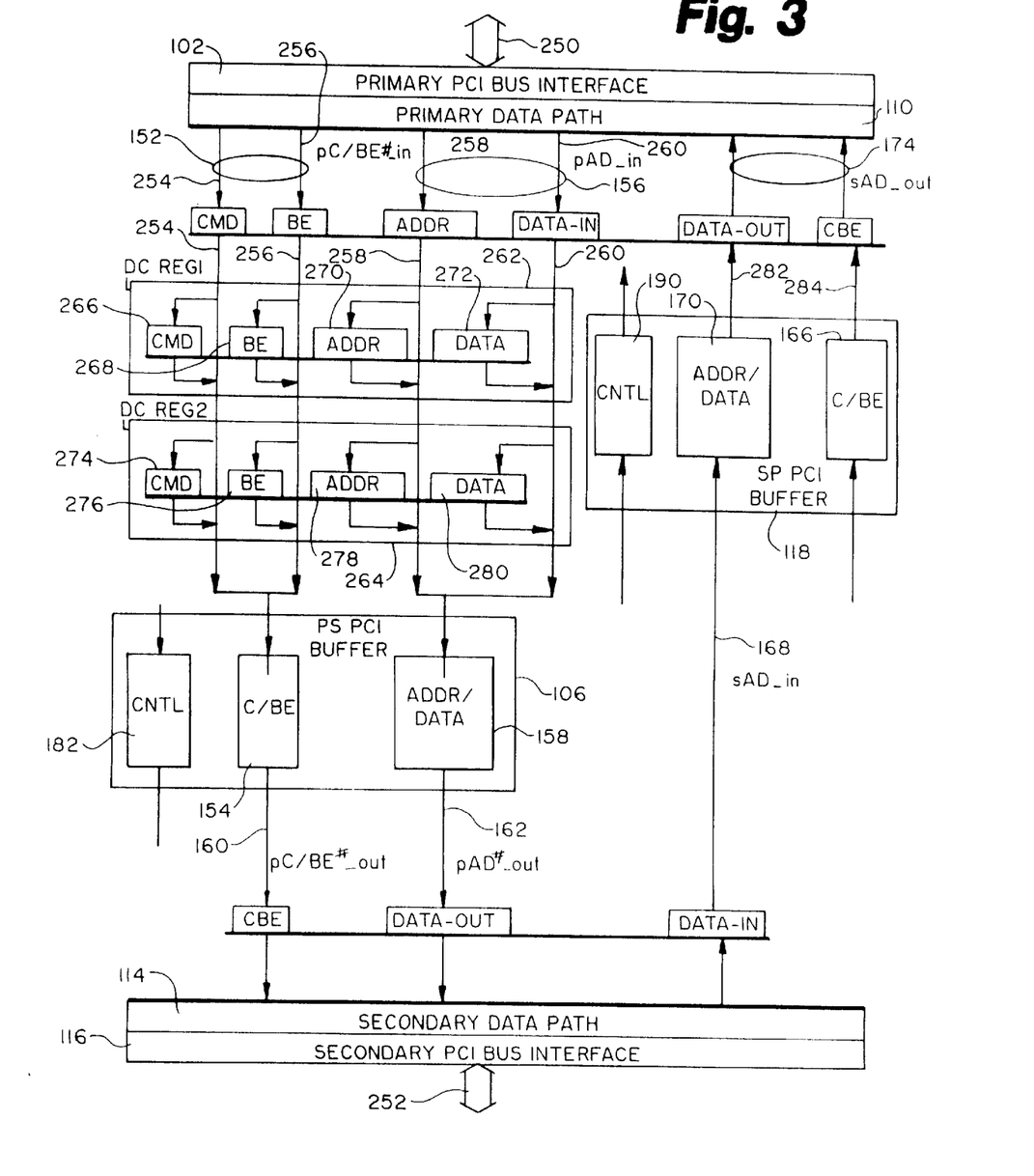
FIG. 3 is a diagram of one embodiment of the information transfer paths of the PCI to PCI bridge device according to the present invention.

FIG. 3 illustrates a more detailed diagram of one embodiment of the information transfer paths of the PCI bridge device 100. The present invention is arranged to allow command responses to be returned in a sequence independent of the sequence of commands initiated from the initiator bus. In one embodiment, this can be implemented through the use of memory registers, and the proper control over the use of those registers. FIG. 3 introduces one example of such memory registers and their arrangement with respect to a bus bridge, such as the PCI to PCI bridge 100 in FIG. 2.

Referring now to the example of FIG. 3, the bus 250 is shown interfacing with the primary PCI bus interface 102, which provides access to the primary data path block 110. Similarly, on the secondary side of the PCI bridge device 100 is the bus 252 which interfaces to the PCI bridge device via the secondary PCI bus interface 116, which in turn provides access to the secondary data path block 114. As was described in connection with FIG. 2, various address, data, and command code information is passed between the data path blocks 110 and 114. The signal labeled pC/BE#_in on signal bus 152, comprising the command code on line 254 and the byte enable signal on line 256, passes to the C/BE segment 154 in the PS PCI buffer 106. Similarly, the signal labeled pAD_in on signal bus 156, comprising the address bus 258 and the data bus 260, passes to the ADDR/DATA segment 158 in the PS PCI buffer 106. The CNTL segment 182 in the PS PCI buffer 106 stores a control code which will be described in further detail below.

The delayed completion registers labeled DC REG1 262, and DC REG2 264 are coupled in parallel to the signals on lines 254, 256, 258, and 260. The delayed completion register DC REG1 262 includes four register segments, including the command code, byte enable, address and data segments labeled CMD 266, BE 268, ADDR 270, and data 272 respectively. The delayed completion register DC REG2 264 likewise includes four register segments, including the command code, byte enable, address and data segments labeled CMD 274, BE 276, ADDR 278, and data 280 respectively. These delayed completion registers will be described in greater detail in connection with FIG. 4.

One embodiment of the PS PCI buffer 106 includes a 42 bit wide by 32 entry deep first-in-first-out (FIFO) RAM register array. In this embodiment, the control segment 182 is four bits wide, the C/BE segment 154 is four bits wide, and the ADDR/DATA segment 158 is 32 bits wide, plus one parity bit. One remaining bit is used for common mode architecture (CMA) buffer flush control. The command code and byte enable signals exit the PS PCI buffer 106 as the pC/BE#_out signal on line 160, which then enters the secondary data path 114, the secondary PCI bus interface 116, and ultimately to the bus 252.

The address and data information is also sent from the PS PCI buffer 106 to the bus 252. The address and data information exits the PS PCI buffer 106 as the pAD_out signal on line 162. On a write request from bus 250 to bus 252, additional write data will be stored in the ADDR/DATA segment 158 which is then passed to the bus 252 via path 162. Where the bus 250 has issued a read command, the targeted device on the bus 252 will provide data in response to that read command, and this data is returned via path 168, having the signal labeled sAD_in. This data is stored in the SP PCI buffer 118, which includes control, address, data, and command code registers as in the PS PCI buffer 106. Therefore, on a read command from bus 250 to bus 252, data returning from the bus 252 is stored in the ADDR/DATA segment 170, and is returned to the bus 250 via path 282. Command code and byte enable information is stored in the C/BE segment 166 in the SP PCI buffer 118, and is returned to the bus 250 via path 284, which is also part of the signal bus 174. The SP PCI buffer 118 also includes the control segment labeled CNTL 190.

The bridge is symmetrical, and while the SP PCI buffer 118 of FIG. 3 illustrates the return path for data for a read command to the bus 250, another data path exists from the bus 252 back to the bus 250. Therefore, although not depicted in FIG. 3, the path from the secondary data path 114 to the primary data path 110 includes circuitry which corresponds to the circuitry from the primary data path 110 to the secondary data path 114, including two additional delayed completion registers. The symmetrical data path from the secondary data path 114 to the primary data path 110 is present because the secondary data path can operate as the initiating bus. For example, the bus 252 can have coupled devices that issue requests to devices coupled to bus 250, thereby effectively switching the initiating and responding functions of the buses 250 and 252.

Figure 4:
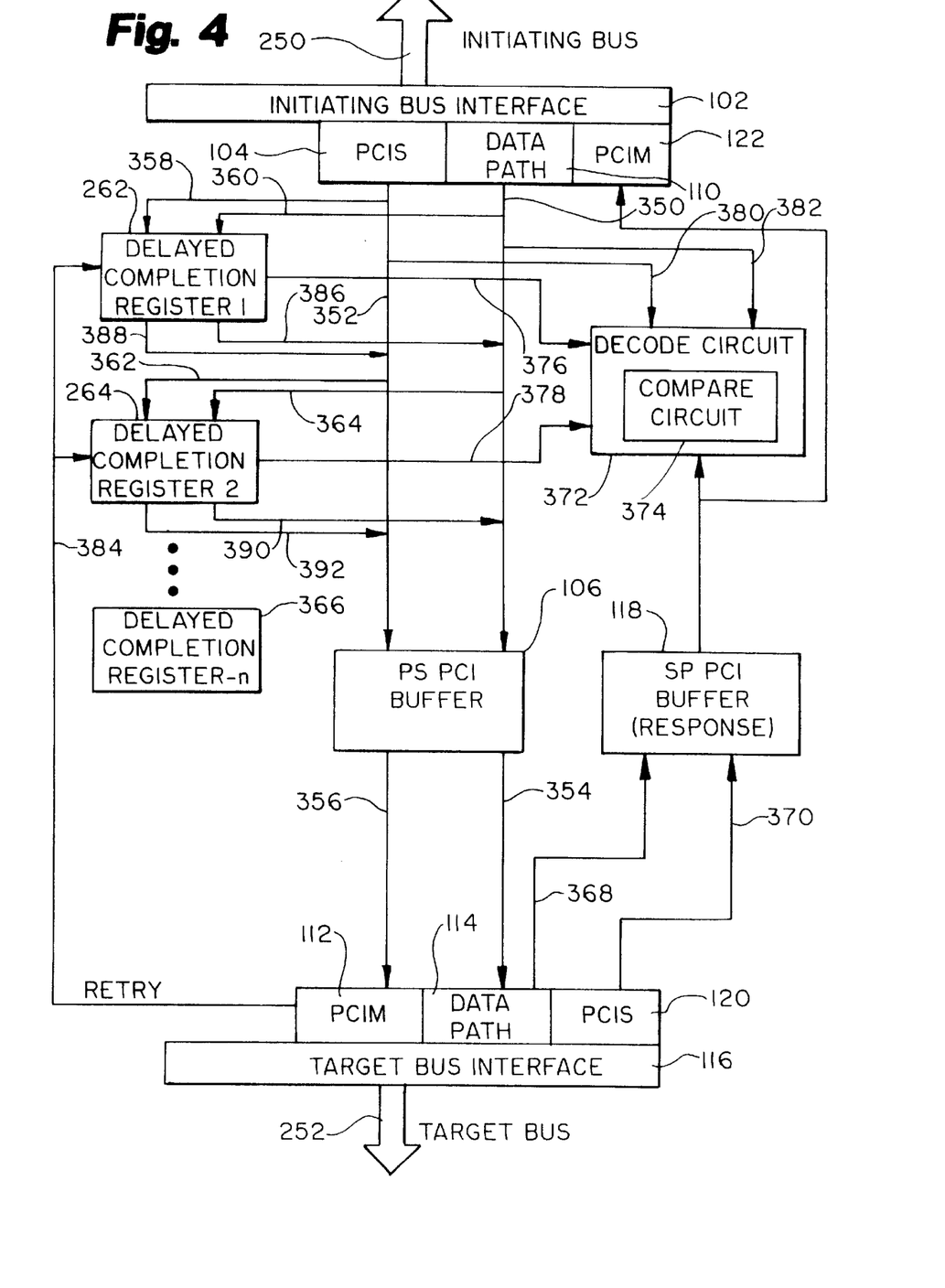
FIG. 4 illustrates one manner of using delayed completion registers in the PCI to PCI bridge according to the invention.

The present invention provides a configuration and arrangement for allowing command cycles to be completed across a bus bridge, such as the bus bridging system of FIG. 3, in a sequence different than the command initiation sequence. Commands responses are returned in the order that the commands are completed at the target bus, and commands that are not successfully completed at the target bus are retried. The invention permits the incompleted commands to be retried, while allowing command responses to be returned to the initiating device in the order that the command is completed at the target bus, regardless of whether the command was retried or not. Subsequently issued commands can therefore move ahead of unsuccessfully completed commands, by resubmitting the unsuccessfully completed commands following the submission of other commands. One embodiment of the invention provides storage registers to delay the completion of the command cycle, thereby allowing other commands to be executed at the target bus, and allowing command responses to be returned in the completion order, rather than the initiation order. FIG. 4 provides an example of an arrangement capable of carrying out these functions.

Referring now to FIG. 4, the buses 250 and 252 are referred to in a logical sense as the initiating bus 250 and the target bus 252 to illustrate one manner of using the delayed completion registers in the PCI to PCI bridge. As illustrated in FIG. 3, the initiating bus 250 is coupled to the primary PCI bus interface 102, which is also the initiating bus interface when a command is initiated. The target bus 252 is coupled to the secondary PCI bus interface 116, referred to as the target bus interface. The initiating bus interface 102 is coupled to a master and a slave block, labeled as the PCIM 122 (master) and the PCIS (slave) 104 respectively. The address and data information interfaces to the PCI bridge device 100 via the data path block 110. The target bus interface 116 is also associated with a master labeled PCIM 112, a data path block 114, and a slave labeled PCIS 120. The PS PCI buffer 106, the SP PCI buffer (response buffer) 118, and the delayed completion registers 262 and 264 are also shown. In this embodiment, the command code and byte enable information is provided by the PCI slave (PCIS) 104.

The signals driven from the data path 110 to the delayed completion registers 262 and 264 and the PS PCI buffer 106 are shown on buses 350 and 352, which collectively include the signals on lines 254, 256, 258, and 260 shown in FIG. 3. The signals outputted from the PS PCI buffer 106 are shown as buses 354 and 356, which includes the signals on lines 160 and 162 of FIG. 3. Bus 350 includes the address and data information, and bus 352 includes the command code and byte enable information. The information, which is sent to the PS PCI buffer, is also outputted to delayed completion register-1 262 via lines 358 and 360, and to delayed completion register-2 264 via lines 362 and 364.

The delayed completion register-1 262 and delayed completion register-2 264 each store one complete command, including the address, data, command code, and byte enable information sent from the initiating bus interface 102. FIG. 4 shows two delayed completion registers 262 and 264, however additional delayed completion registers can be used, as represented by delayed completion register-n 366. Where two devices that can initiate commands exist on the initiating side, two delayed completion registers can be used. Where a larger number of command-initiating devices are present on the initiating side, a correspondingly larger number of delayed completion registers may be used.

A command issued from the initiating bus interface 102 is therefore stored in the PS PCI buffer 106, and one of the delayed completion registers, such as delayed completion register-1 262. The state of a flag determines which of the delayed completion registers will receive a given command. The command exits the PS PCI buffer 106, which is a first-in-first-out (FIFO) data queue in the present example, in a first-in-first-out fashion. The command information enters the target side at the PCI master (PCIM) 112 and the data path 114 via buses 356 and 354 respectively. The PCIM 112 and the data path 114 blocks provide the command to the bus 252 via the target bus interface 116. The characteristics of the PS PCI buffer 106 may be determined in a manner described herein and in copending U.S. patent application, Ser. No. 08/721,252, (Attorney docket number 11422.31-US-01) entitled "Address/Data Queuing Arrangement and Method For Providing High Data Through-put Across Bus Bridge", which is assigned to the assignee of the instant application and filed concurrently herewith, the contents of which are incorporated herein by reference.

A targeted device coupled to bus 252 is expected to provide a response to the initiating bus interface 102 within a predetermined time. Where the buses are PCI buses, this time corresponds to 16 clock cycles. When the targeted device successfully completes the command, it responds with a command response to the SP PCI buffer, or response buffer, 118. The address and data information is provided to the response buffer 118 via bus 368, and the command code and byte enable information is provided to the response buffer 118 via bus 370. The SP PCI buffer 118 queues the command responses in a first-in-first-out sequence, which results in command responses queued in the order that they were completed on the bus 252.

The targeted device does not always complete the command within the allotted time, which is 16 clock cycles for PCI bus architectures. In such cases, the target device returns a retry within the allotted time. Then, the initiating device reissues the command on the PCI bus. The delayed completion registers 262 or 264 will reissue a command into the corresponding PCI buffer in response to a retry signal sent from the PCIM 112 and its target bus. By reissuing the command, the command is again queued on the PS PCI buffer 106, and another attempt to complete the command will occur at the targeted device.

It is possible, however, that while the initiating device is reissuing the command, the originally issued command is completed on the bus 252. The reissued command is cleared from the delayed completion register with the completion of the original cycle. The delayed completion register will reissue a command via the PCI buffer only in response to a retry command. For example, where the initiating bus interface 102 has reissued a command, a comparison is performed to determine if the command is already stored in the SP PCI buffer 118. A portion of this command response is decoded at the decode circuitry 372 to determine which of the delayed completion registers must be cleared. The delayed completion register identified by the decode circuitry 372 is then cleared. The portion of the command response that is decoded is the control code stored in the CNTL segment 190 of the SP PCI buffer 118, as illustrated in FIG. 3. Where the initiating device has reissued the command, the delayed completion register designated by the control code is cleared to disable execution of the reissued command.

The decode circuitry 372 includes a compare circuit 374 that compares the control code of the CNTL segment 190 to a predetermined value corresponding to one of the delayed completion registers. The delayed completion register that corresponds to the control code is cleared by the decode circuit 372, as long as a command has been reissued. To determine whether a command has been reissued, the decode circuit 372 compares the command currently holding on the bus 250 with the command stored in the delayed completion register corresponding to the control code. The command from the delayed completion register corresponding to the control code is therefore sent to the decode circuitry 372 via bus 376 or 378. The command from the bus 250 is routed to the decode circuitry 372 via buses 380 and 382, and is compared to the delayed completion register corresponding to the control code. For example, the control code may indicate that the command response is associated with delayed completion register-1 262, but the contents of delayed completion register-1 262 must be compared to the command currently holding on the bus 250 to know that the command has been reissued. If a match is found, then the clearing function is performed to clear the delayed completion register since the reissued command is completed.

A command retry can also be initiated from the target bus interface 116, rather than by the initiating bus interface 102. Where the targeted device is not able to complete the command, the PCIM 112 may issue a retry signal on line 384 to either the delayed completion registers 262 or 264, depending on the control code. Upon receiving the retry signal on line 384, the selected delayed completion register will queue the command again, by driving its stored command to the PS PCI buffer 106. For delayed completion register-1 262, the command will be driven to the PS PCI buffer 106 via buses 386 and 388. For the delayed completion register-2 264, the command will be driven to the PS PCI buffer 106 via buses 390 and 392.

Where the commands are re-entered into the PS PCI buffer 106 by way of a retry signal on line 384 to one of the delayed completion registers, the re-queued command may be placed "behind" another command within the PS PCI buffer 106. The arrangement and configuration of the present invention, including the delayed completion registers and the response buffer 118, allows a subsequently-issued command to complete its command cycle prior to a previously-issued command. For example, a second command issued after a first command may be placed in the response buffer 118 ahead of the first command, where the first command has been reissued, because the delayed completion registers can repeatedly provide commands to the PS PCI buffer 100. This allows for variable sequences of command responses, which minimizes the accumulation of commands in the PS PCI buffer 106, by allowing command responses to occur in the order that they are completed, rather than in the order that they are initiated.

Figure 5:
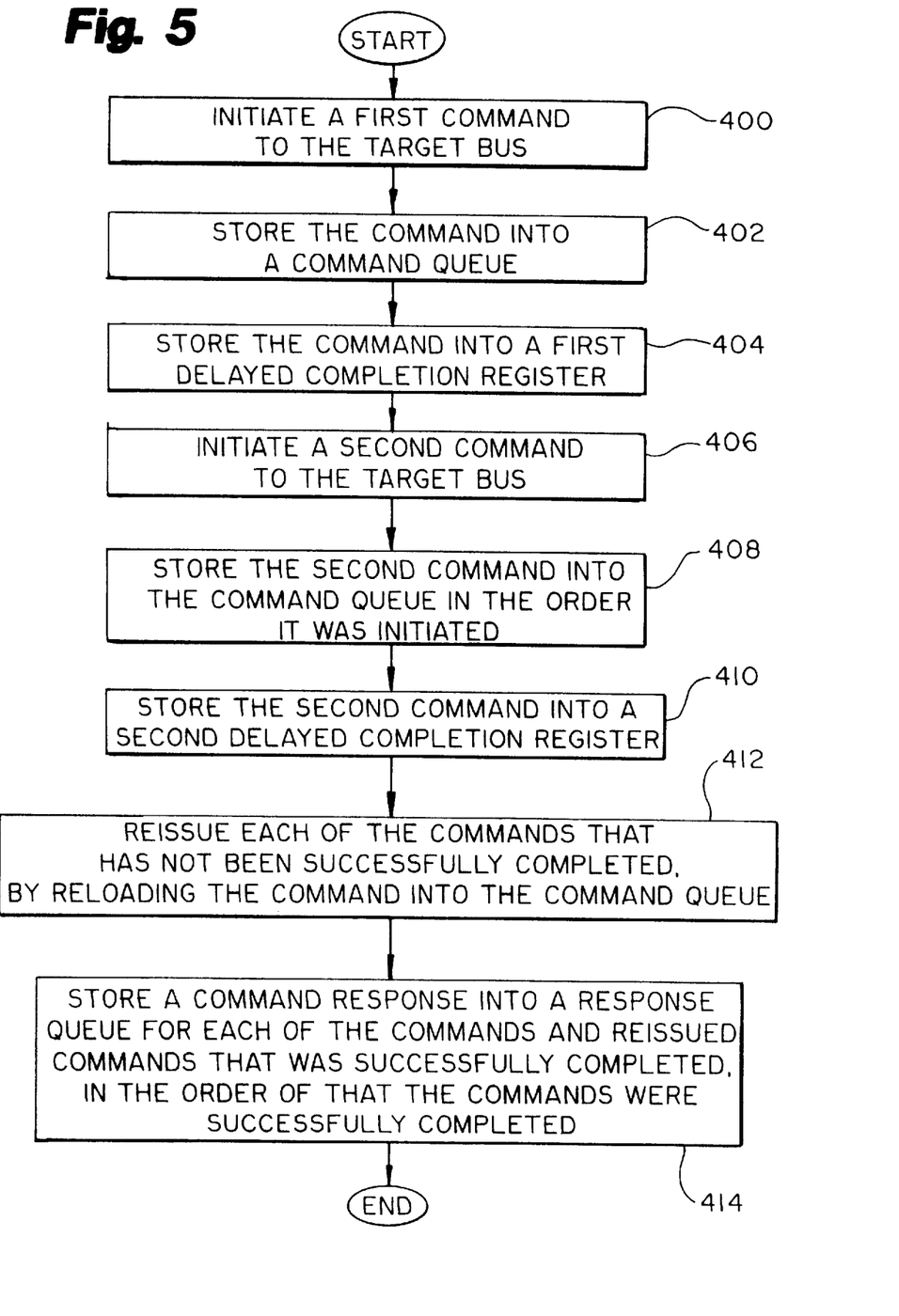
FIG. 5 is a flow diagram illustrating one manner in which commands are executed in accordance with the principles of the present invention.

FIG. 5 is a flow diagram illustrating one manner in which commands are executed in accordance with the principles of the present invention. Referring to step 400, a first command is initiated from the bus 250 to the bus 252. The command is stored into a command queue at step 402, the command queue being the PS PCI buffer 106. Step 404 illustrates that the command is also stored into a first delayed completion register, such as delayed completion register-1 262. Steps 406, 408, and 410 illustrate that a second command can similarly be issued to the bus 252, which is also stored into the PS PCI buffer 106 and into a different delayed completion register such as delayed completion register-2 264. At step 412, the commands are reissued if they have not been successfully completed at the target bus. This occurs by reloading the command into the PS PCI buffer 106 to be queued. The reissue of the command can be initiated in various ways, including a reissue by the initiating device because a command response was not received in a predetermined time period, or by the target device where a retry signal on line 384 is returned to the appropriate delayed completion register. Each of the commands, whether an originally issued command or a reissued command, generates a command response to be stored in the SP PCI response buffer 118 when the corresponding original command or reissued command has completed successfully. These command responses are queued in the SP PCI buffer 118 in the order that they are successfully completed, and are not necessarily in the order that the corresponding commands were initiated at the initiating bus.

Figure 6:
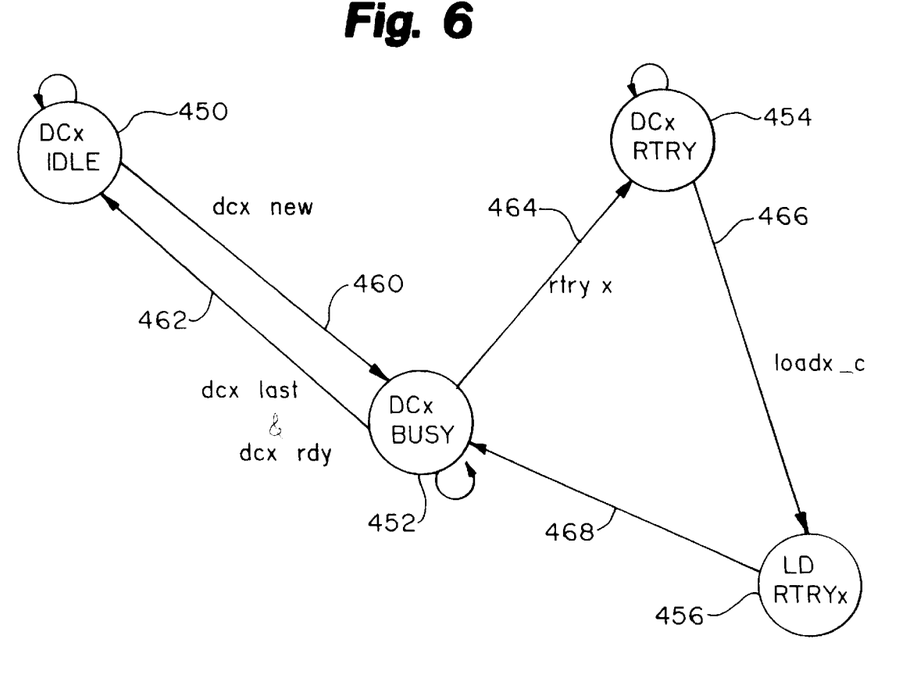
FIG. 6 is a state flow diagram illustrating one configuration of the delayed completion state machines in accordance with the principles of the present invention.

FIG. 6 is a state flow diagram illustrating one configuration of the delayed completion state machines in accordance with the principles of the present invention. Each of the delayed completion registers in the system, such as delayed completion registers 262 and 264, operates in substantially the same manner so that each can be represented by a common state flow diagram. Therefore, FIG. 6 applies to the state machines for both delayed completion register-1 262 and register-2 264. Accordingly, each state machine has 5 states, which are shown as DCx_IDLE 450, DCx_BUSY 452, DCx_RTRY 454, and LDx_RTRY 456, where "x" represents the particular delayed completion register.

The DCx_IDLE state 450 represents the state where no action is pending in the delayed completion register. When a non-posted cycle is initiated in the bridge, at least one of the delayed completion registers must be in the idle state.

The state machine will transition from the DCx_IDLE state 450 to the DCx_BUSY state 452 upon the occurrence of a dcx_new signal shown on line 460. The state of two flags, SEL_1 and SEL_2, determine which state machine will be used. Either of these two flags can be set to reflect which delayed completion register is idle and can therefore be used. The DCx_BUSY state 452 will remain active until either a retry is received from the opposite master block or a response is received through the FIFO with an active matching command in the PCI registers. When the transaction is complete, the state will return to the DCx_IDLE state 450, as seen by the dcx_last & dcx_rdy signals shown on line 462.

The DCx_RTRY state 454 is entered when the opposite master returns a rtry_x response on line 464 to the DCX_RTRY state 454 in the slave block. While in the DCx_RTRY state 454, the DCx_RTRY state 454 will cause a reload of the saved command in the delayed completion register into the command FIFO (PS PCI buffer 106), and then will transition to the LDx_RTRY state 456.

The LDx_RTRY state 456 will exist for one cycle and will load the data and byte enables into the PS PCI buffer 106 behind the address and command, as represented by the loadx_c signal on line 466. From the LDx_RTRY state 456, it will transition back to the DCx_BUSY state 452 via line 468.

Figure 7:
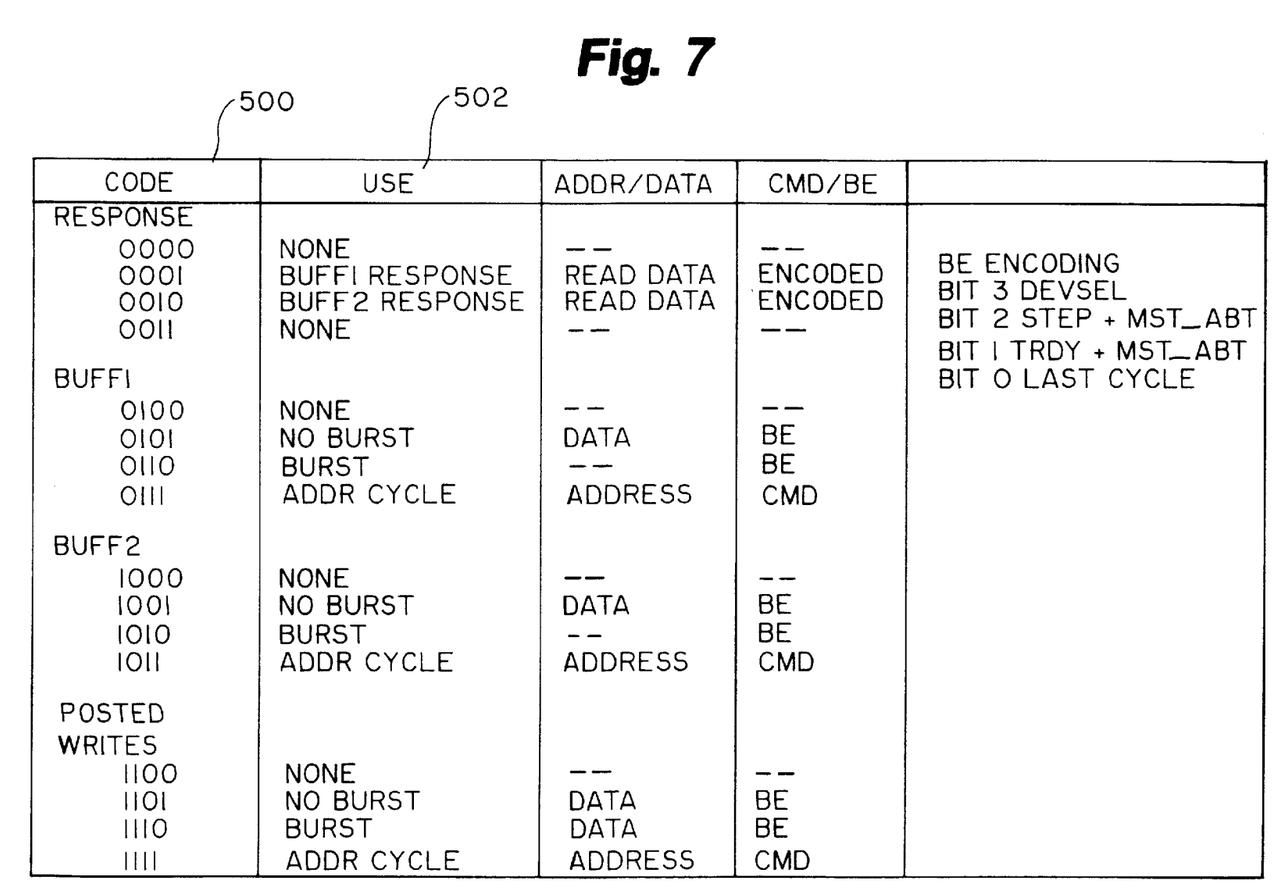
FIG. 7 is a table representing the control codes in accordance with the present invention.

FIG. 7 is a table representing the control codes in accordance with one embodiment of the present invention. The control code is the decoded portion of the command response, from the CNTL segment 190, that indicates which of the delayed completion registers the command response is associated with. As previously described, the control code indicates whether the command response is associated with delayed completion register-1 262, delayed completion register-2 264, or some other delayed completion register available in the bridge.

Referring now to the table columns in FIG. 7, the code column 500 represents the various bit patterns of the control code and the various control categories. The "response" category indicates the situations where a command response is returned to the SP PCI buffer 118. Where the response bit pattern is "0 0 0 1", the use column 502 indicates that a "buff1 response" has occurred, which indicates that the response is associated with a command stored in delayed completion register-1 262. Similarly, where the response bit pattern is "0 0 1 0", the use column 502 indicates that a "buff2 response" has occurred, thereby indicating that the response is associated with a command stored in delayed completion register-2 264. The compare circuit 374 in the decode circuit 372 receives the response bit pattern from the use column 502, and compares it to a predetermined value to determine which of the delayed completion registers stores the command corresponding to the command response.

The control codes are also provided with the command response back to the initiating device on the bus 250. The initiating master receives the control code, and determines whether the command response is associated with its issued command. Where the control code in the command response is associated with an issued command, the corresponding initiating device thereafter completes its command cycle.

It is to be understood that various data transfer techniques can be used in conjunction with the bridging architecture disclosed herein, such as the data transfer techniques and structure which is generally disclosed in connection with FIGS. 3 and 4 in copending U.S. Pat. application, Ser. No. 08/718,969 (Attorney docket number 11422.32-US-01) entitled "Selective Latency Reduction in Bridge Circuit Between Two Busses", which is assigned to the assignee of the instant application and filed concurrently herewith, the contents of which are incorporated herein by reference.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bus interface bridge for providing command responses in a sequence independent of the sequence that commands are transferred from an initiating bus to a target bus, the bus interface bridge comprising:

a first memory array including a First-In-First-Out (FIFO) memory queue, configured and arranged to store commands from the initiating bus and to provide the commands to the target bus in a first sequence;

a plurality of delayed completion registers, each configured and arranged to receive and store a corresponding one of the commands and to re-enter the corresponding one of the commands into the first memory array upon receipt of a retry signal; and a second memory array coupled to the target bus to store command responses in a second sequence relating to the order in which the corresponding commands were successfully completed.

2. The bus interface bridge as in claim 1, wherein the second memory array includes a second FIFO memory queue.

3. The bus interface bridge as in claim 2, wherein the second memory array includes command response outputs coupled to the initiating bus to return the command responses, and complete corresponding command cycles.

4. The bus interface bridge as in claim 1, further including a retry signal generator, configured and arranged to provide the retry signal to the delayed completion registers that store unsuccessfully completed ones of the commands.

5. The bus interface bridge as in claim 1, further including a target bus retry signal generator coupled to the target bus to provide the retry signal to the delayed completion registers which store the commands that were not successfully completed at the target bus.

6. The bus interface bridge as in claim 1, further including an initiating bus retry generator to reissue the commands to the delayed completion registers and the first memory array when the initiating bus has not received corresponding command responses for the commands within a predetermined time.

7. The bus interface bridge as in claim 6, further including a decode circuit to receive the command responses from the second memory array, and to clear the corresponding command from the delayed completion register in response thereto.

8. The bus interface bridge as in claim 7, wherein the decode circuit includes a compare circuit to compare a code in the command responses to predetermined register values assigned to each of the delayed completion registers, and to clear the delayed completion register corresponding to the code.

9. The bus interface bridge as in claim 1, further including:
   a target bus retry signal generator coupled to the target bus to provide the retry signal to the delayed completion registers which store the commands that were not successfully completed at the target bus; and
   an initiating bus retry generator to reissue the commands to the delayed completion registers and the first memory array when the initiating bus has not received corresponding command responses for the commands within a predetermined time.

10. The bus interface bridge as in claim 9, further including a decode circuit to receive the command responses from the second memory array, and to clear the corresponding command from the delayed completion register and the second memory array in response thereto.

11. The bus interface bridge as in claim 10, wherein the decode circuit includes a compare circuit to compare a code in the command responses to predetermined register values assigned to each of the delayed completion registers, and to clear the delayed completion register corresponding to the code.

12. The bus interface bridge as in claim 1, wherein the number of the delayed completion registers existing in the bus interface bridge corresponds to the number of the commands that can be concurrently active.

13. The bus interface bridge as in claim 1, wherein each of the plurality of delayed completion registers receives one of the commands from a different command-initiating master device.

14. A method for providing command responses in a sequence independent of the sequence in which commands are transferred from the initiating bus to the target bus, the method comprising:
   storing each of the commands into corresponding registers, and storing all of the commands into a first FIFO memory queue in a first sequence corresponding to the order that the commands are initiated;
   executing the commands at the target bus;
   initiating a retry response for the commands which are not successfully completed, and reloading the commands from their corresponding register into the first memory queue in response to the retry response; and
   storing command responses in a second memory queue in a second sequence corresponding to the order in which the commands from the first memory queue are successfully completed.

15. The method of claim 14, wherein initiating a retry response comprises providing the retry response to the register that stores the command which was not successfully completed, and forwarding the contents of the register to the first memory queue.

16. The method of claim 14, wherein initiating a retry response comprises initiating a retry response at the initiating bus.

17. The method of claim 16, wherein initiating a retry response at the initiating bus comprises initiating a retry response at the initiating bus when the initiating bus has not received a corresponding command response for the command within a predetermined time.

18. The method of claim 14, wherein initiating a retry response comprises initiating a retry response at the target bus.

19. The method of claim 18, wherein initiating a retry response at the target bus comprises wherein initiating a retry response at the target bus when the command is not completed at the target bus within a predetermined time.

20. The method of claim 14, further comprising determining which of the registers is storing the command corresponding to the next one of the command responses in the second memory queue.

21. The method of claim 20, wherein determining which of the registers is storing the command comprises comparing at least a portion of the command response to a predetermined register indicator.

22. The method of claim 21, wherein comparing at least a portion of the command response to a predetermined register indicator comprises comparing a control code within the command response to the predetermined register indicator, and wherein the control code matches one of the predetermined register indicators.

23. The method of claim 20, further comprising clearing the register that is storing the command corresponding to the next one of the command responses in the second memory queue.

24. The method of claim 23, further comprising clearing the first memory queue with respect to the portion of the first memory queue that is storing the command corresponding to the next one of the command responses in the second memory queue.

25. The method of claim 14, wherein the first and second sequences are unequal.

26. The method of claim 14, wherein the first and second sequences are equal.

27. A system for increasing command response cycle times of commands issued by a processing unit, comprising:
   a first bus, coupled to the processing unit, to transfer the commands;
   a second bus to transfer the commands to target circuits;
   a bus interface bridge, coupled between the first and second buses, to provide command responses from the second bus in an order independent of the order of the commands transferred from the first bus, comprising:
      a first FIFO memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal; and a second FIFO memory array coupled to the target bus to store command responses in a second sequence relating to the order in which the corresponding commands were successfully completed.

28. The system of claim 27, wherein the first bus is a peripheral component interconnect (PCI) bus.

29. The system of claim 27, wherein the second bus is a peripheral component interconnect (PCI) bus.

30. The system of claim 27, further comprising a retry signal generator, configured and arranged to provide the retry signal to the delayed completion registers that store unsuccessfully completed commands.

31. The system of claim 27 further comprising:

a target bus retry signal generator coupled to the target bus to provide the retry signal to the delayed completion registers which store the commands that were not successfully completed at the target bus; and an initiating bus retry generator to reissue the commands to the delayed completion registers and the first memory array when the initiating bus has not received corresponding command responses for the commands within a predetermined time.

32. The system of claim 31, further comprising a decode circuit to receive the command responses from the second memory queue, and to clear the corresponding command from the delayed completion register and the first memory array in response thereto.

33. The bus interface bridge as in the system of claim 32, wherein the decode circuit comprises a compare circuit to compare a code in the command responses to predetermined register values assigned to each of the delayed completion registers, and to clear the delayed completion register corresponding to the code.

34. The bus interface bridge as in claim 27, wherein each of the plurality of delayed completion registers receives one of the commands from a different command-initiating master device.

35. A bus interface bridge for providing command responses in a sequence independent of the sequence that commands are transferred from an initiating bus to a target bus, the bus interface bridge comprising:

a first memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal;

a second memory array coupled to the target bus to store command responses in a second sequence relating to the order in which the corresponding commands were successfully completed; and a retry signal generator configured and arranged to provide the retry signal to the delayed completion registers that store unsuccessfully completed ones of the commands.

36. A bus interface bridge for providing command responses in a sequence independent of the sequence that commands are transferred from an initiating bus to a target bus, the bus interface bridge comprising:

a first memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal;

a second memory array coupled to the target bus to store command responses in a second sequence relating to the order in which the corresponding commands were successfully completed; and a target bus retry signal generator coupled to the target bus to provide the retry signal to the delayed completion registers which store the commands that were not successfully completed at the target bus.

37. A bus interface bridge for providing command responses in a sequence independent of the sequence that commands are transferred from an initiating bus to a target bus, the bus interface bridge comprising:

a first memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal;

a second memory array coupled to the target bus to store command responses in a second sequence relating to the order in which the corresponding commands were successfully completed; and an initiating bus retry generator to reissue the commands to the delayed completion registers and the first memory array when the initiating bus has not received corresponding command responses for the commands within a predetermined time.

38. The bus interface bridge as in claim 37, further including a decode circuit to receive the command responses from the second memory array, and to clear the corresponding command from the delayed completion register in response thereto.

39. The bus interface bridge as in claim 38, wherein the decode circuit includes a compare circuit to compare a code in the command responses to predetermined register values assigned to each of the delayed completion registers, and to clear the delayed completion register corresponding to the code.

40. A bus interface bridge for providing command responses in a sequence independent of the sequence that commands are transferred from an initiating bus to a target bus, the bus interface bridge comprising:

a first memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal, wherein the number of the delayed completion registers existing in the bus interface bridge corresponds to the number of the commands that can be concurrently active; and a second memory array coupled to the target bus to store command responses in a second sequence relating to the order in which the corresponding commands were successfully completed.

41. A bus interface bridge for providing command responses in a sequence independent of the sequence that commands are transferred from an initiating bus to a target bus, the bus interface bridge comprising:

a first memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal, wherein each of the delayed completion registers receives one of the commands from a different command-initiating master device; and a second memory array coupled to the target bus to store command responses in a second sequence relating to the order in which the corresponding commands were successfully completed.

42. A method for providing command responses in a sequence independent of the sequence in which commands are transferred from the initiating bus to the target bus, the method comprising:

storing each of the commands into corresponding registers, and storing all of the commands into a first memory queue in a first sequence corresponding to the order that the commands are initiated;

executing the commands at the target bus;

initiating a retry response for the commands which are not successfully completed including providing the retry response to the register that stores the command which was not successfully completed, and forwarding the contents of the register to the first memory queue, and reloading the commands from their corresponding register into the first memory queue in response to the retry response; and storing command responses in a second memory queue in a second sequence corresponding to the order in which the commands from the first memory queue are successfully completed.

43. A method for providing command responses in a sequence independent of the sequence in which commands are transferred from the initiating bus to the target bus, the method comprising:

storing each of the commands into corresponding registers, and storing all of the commands into a first memory queue in a first sequence corresponding to the order that the commands are initiated;

executing the commands at the target bus;

initiating a retry response for the commands which are not successfully completed, and reloading the commands from their corresponding register into the first memory queue in response to the retry response, including initiating a retry response at the initiating bus; and storing command responses in a second memory queue in a second sequence corresponding to the order in which the commands from the first memory queue are successfully completed.

44. A method for providing command responses in a sequence independent of the sequence in which commands are transferred from the initiating bus to the target bus, the method comprising:

storing each of the commands into corresponding registers, and storing all of the commands into a first memory queue in a first sequence corresponding to the order that the commands are initiated;

executing the commands at the target bus;

initiating a retry response for the commands which are not successfully completed, and reloading the commands from their corresponding register into the first memory queue in response to the retry response, including initiating a retry response comprising initiating a retry response at the target bus; and storing command responses in a second memory queue in a second sequence corresponding to the order in which the commands from the first memory queue are successfully completed.

45. A method for providing command responses in a sequence independent of the sequence in which commands are transferred from the initiating bus to the target bus, the method comprising:

storing each of the commands into corresponding registers, and storing all of the commands into a first memory queue in a first sequence corresponding to the order that the commands are initiated;

executing the commands at the target bus;

initiating a retry response for the commands which are not successfully completed, and reloading the commands from their corresponding register into the first memory queue in response to the retry response;

storing command responses in a second memory queue in a second sequence corresponding to the order in which the commands from the first memory queue are successfully completed; and determining which of the registers is storing the command corresponding to the next one of the command responses in the second memory queue.

46. The method of claim 45, wherein determining which of the registers is storing the command comprises comparing at least a portion of the command response to a predetermined register indicator.

47. The method of claim 46, wherein comparing at least a portion of the command response to a predetermined register indicator comprises comparing a control code within the command response to the predetermined register indicator, and wherein the control code matches one of the predetermined register indicators.

48. The method of claim 45, further comprising clearing the register that is storing the command corresponding to the next one of the command responses in the second memory queue.

49. The method of claim 48, further comprising clearing the first memory queue with respect to the portion of the first memory queue that is storing the command corresponding to the next one of the command responses in the second memory queue.

50. A system for increasing command response cycle times of commands issued by a processing unit, comprising:

a first bus, coupled to the processing unit, to transfer the commands;

a second bus to transfer the commands to target circuits;

a bus interface bridge, coupled between the first and second buses, to provide command responses from the second bus in an order independent of the order of the commands transferred from the first bus, wherein each of the plurality of delayed completion registers receives one of the commands from a different command-initiating master device, comprising:

a first memory array configured and arranged to store commands from the initiating bus, and to provide the commands to the target bus in a first sequence;

a plurality of delayed completion registers, each configured and arranged to receive and store a corresponding one of the commands, and to re-enter the corresponding one of the commands into the first memory array upon receipt of a retry signal; and a second memory array coupled to the target bus to store command responses in a second sequence relating to the order in which the corresponding commands were successfully completed.

* * * * *